United States Patent
Nakamura

[19]

[11] Patent Number: 6,115,667

[45] Date of Patent: Sep. 5, 2000

[54] METHOD FOR ACQUIRING MAP INFORMATION, METHOD OF NAVIGATION, METHOD OF PROVIDING AREA INFORMATION, NAVIGATION APPARATUS, AREA INFORMATION PROVIDING APPARATUS AND CAR

[75] Inventor: Jin Nakamura, Kanagawa, Japan

[73] Assignee: Sony Corporation, Tokyo, Japan

[21] Appl. No.: 09/272,351

[22] Filed: Mar. 19, 1999

[30] Foreign Application Priority Data

Mar. 31, 1998 [JP] Japan .................................. 10-087284

[51] Int. Cl.[7] .................................................. G06F 15/60
[52] U.S. Cl. .......................... 701/200; 701/211; 701/214; 701/24; 342/46; 342/66; 342/357.01; 342/357.13
[58] Field of Search .................................... 701/200, 207, 701/208, 211, 213, 214, 215, 23, 24; 342/46, 66, 64, 357.01, 357.02, 357.1, 357.13, 450; 348/8, 10; 455/7, 11.1, 13.1

[56] References Cited

U.S. PATENT DOCUMENTS

| | | | |
|---|---|---|---|
| 4,819,174 | 4/1989 | Furuno et al. | 701/211 |
| 5,394,560 | 2/1995 | Kane | 455/12.1 |
| 5,432,542 | 7/1995 | Thibadeau et al. | 348/6 |
| 5,619,211 | 4/1997 | Horkin et al. | 342/357.01 |

*Primary Examiner*—William A. Cuchlinski, Jr.
*Assistant Examiner*—Yonel Beaulieu
*Attorney, Agent, or Firm*—Jay H. Maioli

[57] ABSTRACT

A method for acquiring map information, a method of navigation, a method for providing area information, a navigation apparatus and an area information providing apparatus in which a predetermined broadcasting signal transmitted from a transmitting station, which is different at every area, is received by a receiver where map information at every area, which is included in the received broadcasting signal, is extracted by a map information extractor unit, and the map of an area, to which a present position belongs, is displayed on a display unit based on the extracted map information.

23 Claims, 5 Drawing Sheets

METHOD FOR ACQUIRING MAP INFORMATION, METHOD OF NAVIGATION, METHOD OF PROVIDING AREA INFORMATION, NAVIGATION APPARATUS, AREA INFORMATION PROVIDING APPARATUS AND CAR

BACKGROUND OF THE INVENTION

1. Field of the Invention

The present invention relates to a method for acquiring map information required for displaying, e.g. a road map of the vicinity of a present situation, a method of navigation and a method of providing area information as well as a navigation apparatus and an area information providing apparatus to which the above methods are applied, and a navigation apparatus.

2. Description of the Related Art

In the past, various navigating apparatus which are mounted on a mobil object such as a car or the like have been developed. This navigation apparatus comprises a data storage means of large capacity such as a CD-ROM or the like in which, e.g. a road map data are stored, a detector unit means for detecting a present position, and a display unit for displaying the road map of the vicinity of the detected present position on the basis of readout data from the data storage means. In this case, the detector unit means for detecting the present position includes a position measuring system using an artificial satellite for position measuring, which is termed GPS (Global Position measuring System—hereinafter merely referred to as GPS) and which is based on an autonomous navigation which detects the moving direction, the moving speed, etc. of a vehicle to track the changes from a starting point to the present position.

The road map data of the vicinity of the present position, which are detected by such means for detecting the present position, are read out of the data storage means of large capacity such as the CD-ROM or the like to produce a video signal for displaying the road map. This video signal is supplied to the display unit for displaying the road map of the vicinity of the present position.

By the way, the navigation apparatus as described above requires the data storage means of large capacity for storing the road map and the detecting means for detecting the present position accurately, both of which are to be mounted on each vehicle. This involves a problem in which the apparatus is made extremely large-scale. Specifically, the road map data storage means requires the detailed map data of an area where a car carrying this apparatus moves. Such data have an enormous amount of information and so need the data storage means of large capacity using a storage medium such as the optical disc or the like as well as a readout means of the storage medium. Moreover, as concerns the position measuring means, in case of the position measuring system, e.g. by the aforesaid GPS, it is necessary to receive signals from a plurality of artificial satellites and calculate the present position by operational processings that use the signals received from the respective satellites, which involves very complicated operational processings. This raises the problem that circuits for the operational processings become large-scale.

Furthermore, as regards the road map data storage means using the storage medium such as the optical disc or the like, unless its storage medium is exchanged, it is difficult to revise the road map data to new data. For this reason, a user who possesses the navigation apparatus needs to replace the storage medium storing the road map data with a new version thereof at some intervals (e.g. annually) so that a new opened road, etc. may be displayed on the map, which involves a problem that it takes much time and cost to renew the road map data.

SUMMARY OF THE INVENTION

In view of the foregoing points, an object of the present invention is to make a guidance using the map for navigation by a simple structure in the car, etc. as well as to facilitate the renewal of the guide map without imposing any burden on the user.

According to an aspect of the present invention, there is provide a method for acquiring map information which comprises the steps of receiving predetermined broadcast signals transmitted from transmitting stations which are different in respective areas, extracting the map information on each area which is contained in the received broadcast signals, and storing the extracted map information.

According to this method for acquiring map information, it will be possible to receive the broadcast signals in each area and at the same time acquire the map information on the relevant area to store it.

According to another aspect of the present invention, there is provided a method of navigation which comprises the steps of receiving predetermined broadcast signals transmitted from different transmitting stations in respective areas, extracting the map information on each area contained in this received broadcast signals, and displaying the map within an area covering a current position on the basis of the extracted map information.

According to the method of navigation, it will be possible to receive the broadcast signal in each area and at the same time acquire the map information on the relevant area to display the map within the area covering the current position based on the acquired map information.

According to a further aspect of the present invention, there is provided a method of providing map information which comprises the steps of arranging different transmitting stations in respective areas, each of the transmitting stations transmitting a broadcast signal, and at the same time superposing the map information on an area covering each transmitting station on the broadcast signal from the transmitting station in each area for transmission.

According to this method of providing map information, the broadcast signal from each of the transmitting stations will contain the map information on an area covering the relevant transmitting station.

According to a still further aspect of the present invention, there is provided navigation apparatus which comprises a receiver unit for receiving predetermined broadcast signals transmitted from different transmitting stations in respective areas, a map information extractor unit for extracting the map information on each area contained in the broadcast signal received by the receiver unit, and a video signal generator for generating a video signal to display the map within an area covering a current position on the basis of the extracted map information.

According to this navigation apparatus, it will be possible to produce the video signal for displaying the map of the relevant area based on the map information on each area contained in the broadcast signal.

According to another aspect of the present invention, there is provided a map information providing apparatus according to the which comprises a storage unit for storing map information on an area where one's own station is arranged, and a transmitter unit for superposing the map information stored unit in the storage unit on a signal supplied from a broadcast center side to transmit as a broadcast signal.

According to this map information providing apparatus, the broadcast signal transmitted from the transmitter unit will contain the map information on an area where that transmitter unit is installed.

DESCRIPTION OF THE PREFERRED EMBODIMENTS

An embodiment of the present invention will be described below with reference to the accompanying drawings.

In Europe, a DAB (Digital Audio Broadcasting) according to the EUREKA 147 standard is carried out. In the DAB, various encode processes are practiced to a plurality of digital data to make the same as an DFDM (Orthogonal Frequency Division Multiplex) signal and this OFDM signal is transmitted. As the digital data, 64 channels of digital audio data and so on at maximum can be broadcast at the same time.

Figure 3:
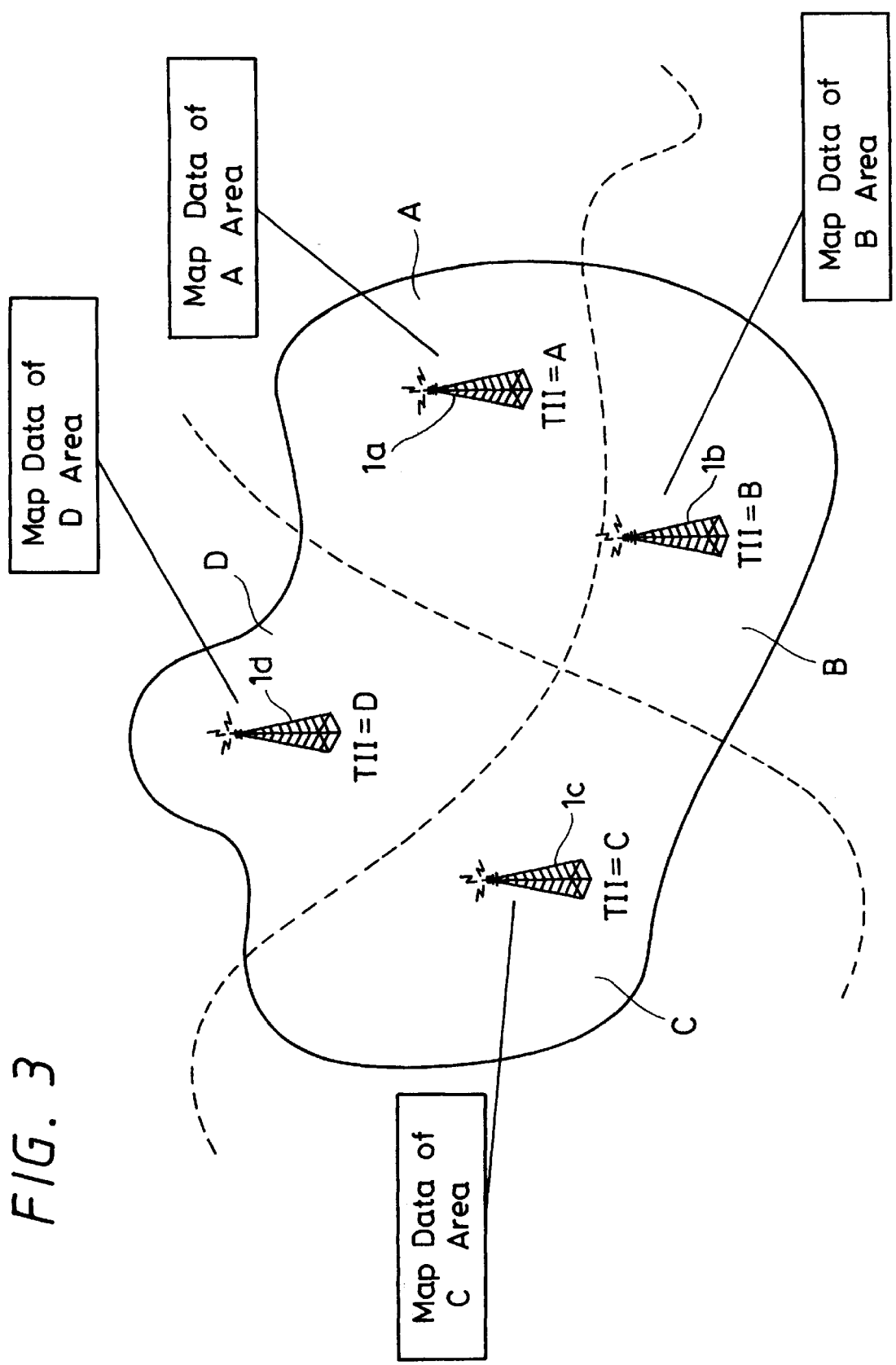
FIG. 3 is an explanatory diagram showing an example of area composition according to an embodiment of the present invention.

The present embodiment is a navigation apparatus mounted on a car, which provides the road map information for the car, i.e. a mobil object by applying this DAB system (DAB) and enables the road map to be displayed. An example of a structure of the digital audio broadcasting system which is applied to the present embodiment will be described first. FIG. 3 shows an example of how to compose areas of the digital audio broadcasting system. In case of this example, within a service area where broadcast waves of this system can reach, are arranged transmitting antennas, namely transmitting stations 1a, 1b, 1c, 1d, etc. at a given interval and are formed broadcast areas A, B, C, D etc. where the broadcast waves from the respective transmitting stations 1a, 1b, 1c, 1d etc. are well received.

In this regard, at least four transmitting stations 1a to 1d in these areas A to D shown in FIG. 3 broadcast a common audio broadcast program transmitted from a common broadcast center (not shown) and at least four transmitting stations 1a to 1d form a network structure (SFN: Single Frequency Network) in which broadcast waves are transmitted by using the same (a single) frequency. Broadcast waves transmitted from the respective transmitting stations 1a to 1d are transmitted, for example, as multicarrier signals in which digital audio data are OFDM modulated.

Figure 4:
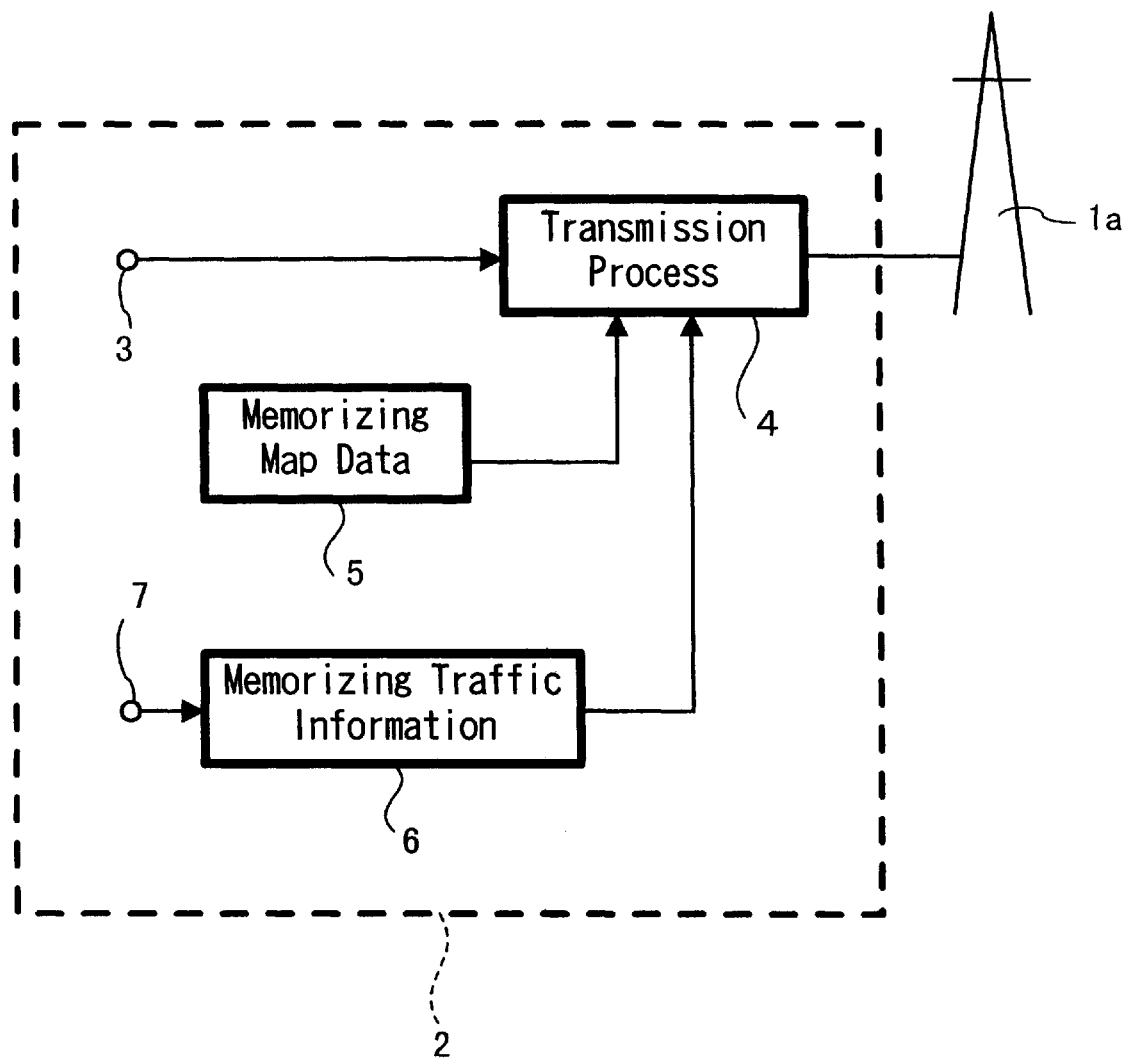
FIG. 4 is a block diagram showing an example of a structure of the transmitting station in each area according to an embodiment of the present invention.

FIG. 4 shows a structure of the transmitting station 1a (Only one transmitting station 1a is shown here, but other stations 1b, 1c and 1d have the same structure.), in which a transmission processing apparatus 2 connected to the transmitting station 1a is supplied with a digital audio data of audio broadcast program from the broadcast center side at an input terminal 3 through a predetermined transmission channel. In this case, plural sorts of audio data are supplied. The digital audio data received at this terminal 3 are supplied to a transmission processor unit 4, which processes to perform an OFDM modulation and make them a multicarrier signal. This multicarrier signal is transmitted by wireless from the transmitting station 1a. The transmission processing apparatus 2 in this example includes a map data storage unit 5, in which storage unit 5 the road map data of an area (An adjacent area is sometimes included.) where the transmitting station is arranged are made to be stored. The road map data stored in this map data storage unit 5 are supplied to the transmission processor unit 4, where they are to be transmitted in the form of data program superposed on the broadcast signal (The details will be described below). Moreover, the transmission processing apparatus 2 in this embodiment includes a traffic information storage unit 6 which storage unit 6 stores once traffic information received at a terminal 7 from a predetermined traffic information center (not shown). This stored traffic information is supplied to the transmission processor unit 4 which transmits them as the data program superposed on the broadcast signal.

Figure 5:
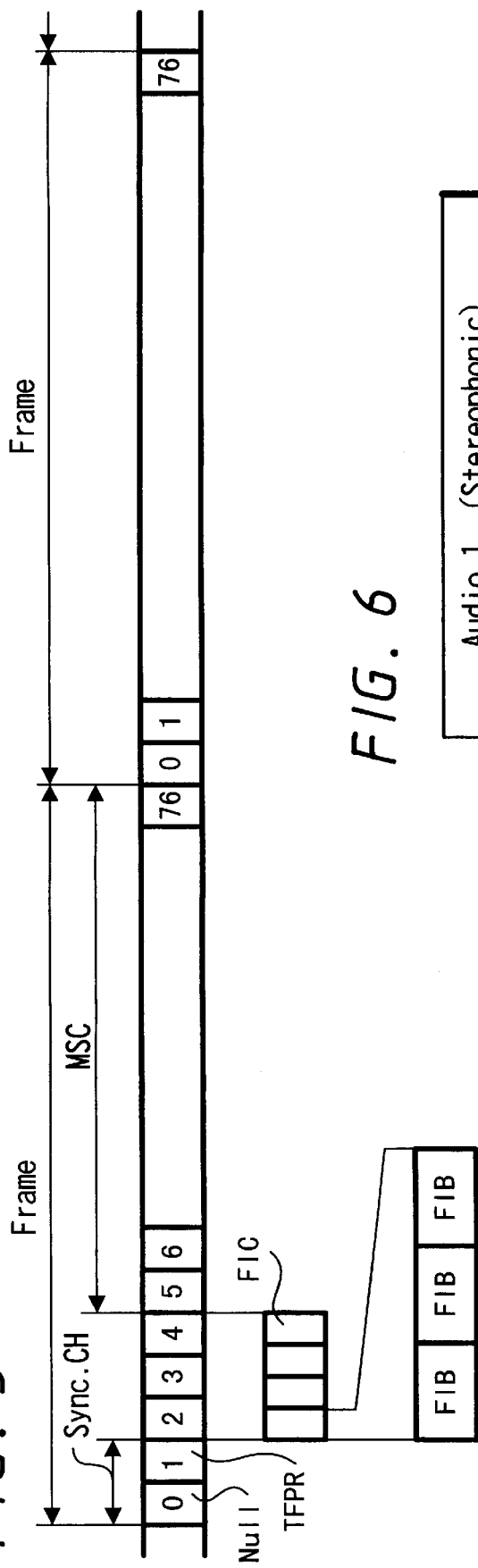
FIG. 5 is an explanatory diagram showing an example of the frame structure of the transmitted signal according to an embodiment of the present invention.

FIG. 5 shows the arrangement of the OFDM signal on a time axis, and this OFDM signal is formed of a plurality of frames. In this case, while the DAB comprise for transmission modes, FIG. 5 shows a case of mode I, and one frame has a time length of 96 seconds. Further, in the case of mode I, each frame is composed of 77 symbols and in each frame, first two symbols form a synchronizing channel, subsequent 3 symbols form four fast information channels FIC and the remaining 72 symbols form a main service channel MSC.

The synchronizing channel is used to detect the deviation of the phase of frame and a received frequency (tuning frequency). Its first symbol is set as a null symbol Null and its second symbol is set as a synchronizing symbol TFPR for a phase reference. By the way, the null symbol Null at every other frame includes identification information TII (Transmitter Identification Information) for identifying a transmitting station and no signal is transmitted in the period of the null symbol Null at the remaining every other frame.

Further, the fast information channel FIC is used to provide the data relating to the main service channel MSC and so on. In the case of mode I, the fast information channel FIC is divided into 3 fast information blocks FIB ancl data such as time, date, type, data array, traffic message or the like are arranged in the fast information block FIB.

In the main service channel MSC, there are disposed digital audio data, which are the main data, and various kinds of data.

Further, when the transmission mode is modes II to IV, the length of frame and the size as will as the number of the fast information channel FIC and the fast information block FIB are different from those in the mode I, but the fundamental structure thereof is the same, so that the description thereon will be omitted. Further, the following embodiment is explained in case of mode I. In case of FIG. 3, at transmitting stations of areas A, B, C and D, the TIIs indicatings the areas A, B, C and D respectively are transmitted.

Figure 6:
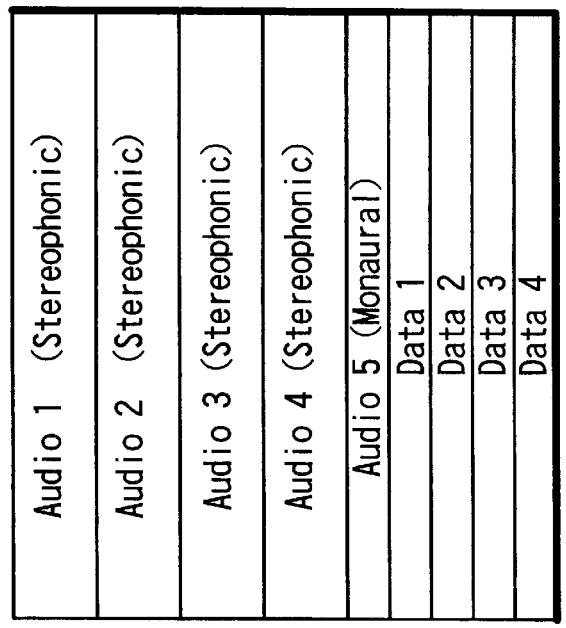
FIG. 6 is an explanatory diagram showing an example of data structure of the transmitted signal according to an embodiment of the present invention.

Incidentally, in the main service channel MSC, a plurality of broadcast programs or the like are multiplexed and transmitted. FIG. 6 shows an example of the arrangement of the main service channel MSC. As shown in FIG. 6, 5 channel audio programs comprised of audio 1 to audio 5 and 4 channel data programs comprised of data 1 to data 4 are multiplexed and transmitted. In this case, the audio data in each channel is made as data compressed and coded by a predetermined audio compression coding system. The 4 channel audio programs of audio 1 to audio 4 are stereophonic audio data and the 1 channel audio program of audio 5 is monaural audio data. As the 4 channel data programs of data 1 to data 4, data of defined program is transmitted at every channel. Here, road map data is transmitted by using one of data channels and also data for displaying the traffic information (traffic congestion information of road, traffic regulation information and so on) are transmitted by using another one data channel. The remaining data channels are used to transmit various kinds of data such as auxiliary data for the audio program (data of title of music and so on,) weather forecast data or the like.

In this case, as regards the audio programs of five channels or audio 1 to audio 5, the plurality of transmitting stations forming a network (e.g. transmitting stations 1a to 1d shown in FIG. 3) transmit the same data basically (There may be a case where some channels are otherwise.). In contrast, as to the data programs, between the channel used for transmitting the road map data and the channel used for transmitting the traffic information data, the data are made different in the respective transmitting stations and are those relating to the area where the respective transmitting stations carry out the transmission.

Specifically, as concerns the broadcast wave transmitted by wireless, e.g. from the transmitting station 1a shown in FIG. 3, the road map information within the area A from the transmitting station 1a and the traffic information within this area A are transmitted as the data program. As to the broadcast waves transmitted from the other transmitting stations 1b, 1c, 1d also, the road map information and the traffic information within the respective areas B, C, D covering the respective transmitting stations are transmitted as the data program. In addition, as to the road map information and traffic information, not only the information within the area covering the relevant transmitting station but also the information of the adjacent area may be transmitted.

The road map information transmitted as the data program is made detailed road map information on the relevant area within the limit that data transmission capacity allows. That is, information on the road where the car can pass is transmitted, or when the data transmission capacity is limited, only information on main roads is transmitted. These road map informations are composed of coordinate position data of reference positions (nodes) such as crossings or the like, vector data which are shape data of roads connecting those nodes, and the like. Furthermore, additional data required for displaying the road map are also transmitted. These road map informations are transmitted from the transmitting stations repeatedly at a predetermined time interval.

Figure 1:
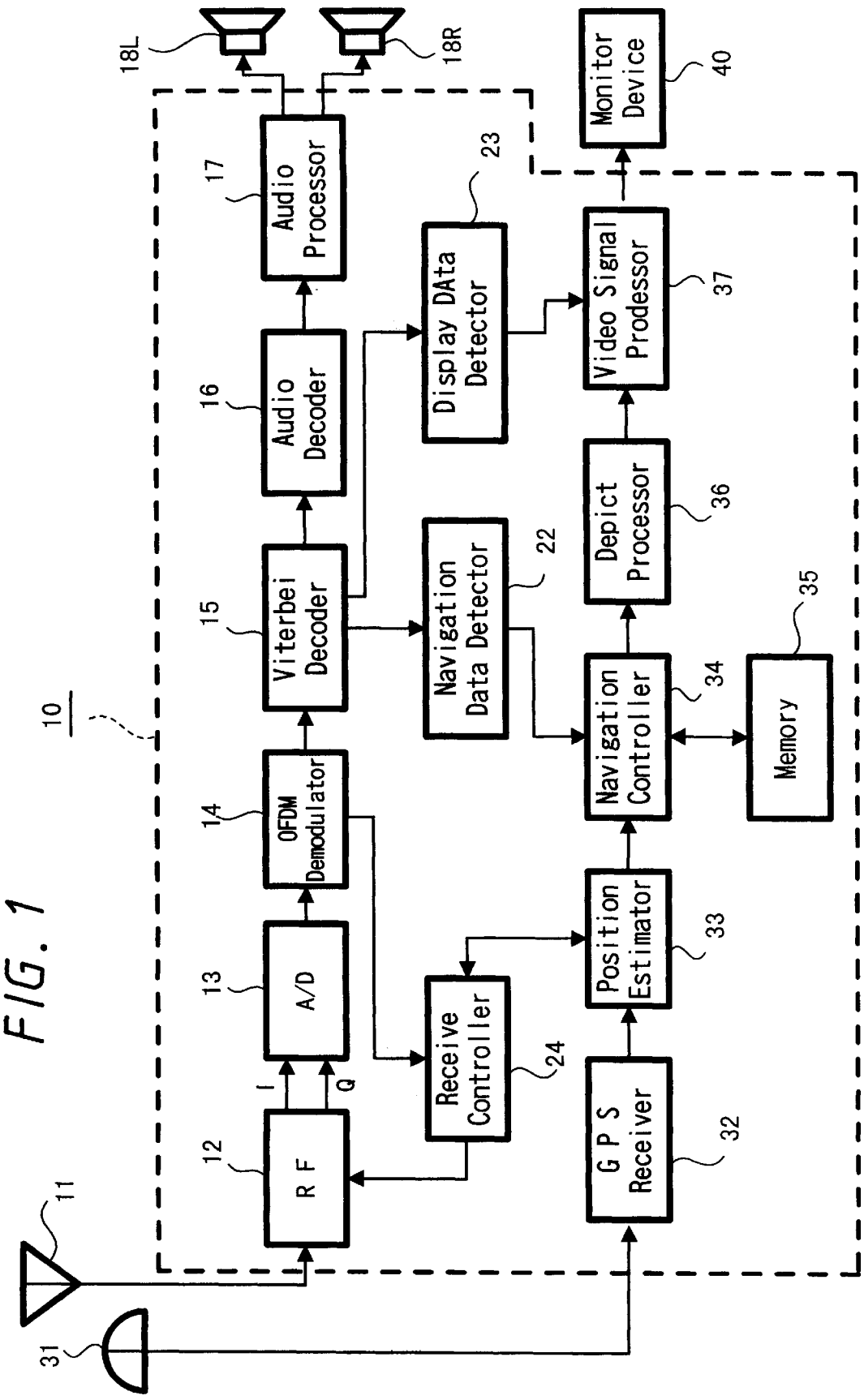
FIG. 1 is a block diagram showing an example of whole structure according to an embodiment of the present invention.

Next, a receiving side structure to receive the broadcast signal transmitted by the above-mentioned broadcasting system configuration will be described. In this embodiment, it is intended that the receiver unit mounted on the car, i.e. a mobile object receives the signal, the receiver unit being integrated into the navigation apparatus. FIG. 1 shows an example of a structure of the navigation apparatus, in which Figure a navigation apparatus 10 with a digital audio broadcast receiving function has an antenna 11 mounted thereon to receive a digital audio broadcast. A signal at a predetermined frequency received by the antenna 11 is processed for reception in a high frequency unit 12 which detects the received signal to derive an I component and a Q component. The frequency received in the high frequency unit 12 is controlled by a receive controller unit 24.

The I component and the Q component detected by the high frequency unit 12 are supplied to an analog/digital converter 13 which converts them into digital data. The converted digital data are supplied to a OFDM demodulator unit 14 which processes to convert between a frequency axis and a time axis through the operational processing by the Fast Fourier transform (FFT) for converting the multicarrier signal into one sequence of serial data. The converted serial data are supplied to a Viterbi decoder 15 which processes to Viterbi decode and output, e.g. the respective audio programs and data programs in the main service channel shown in FIG. 6.

Supplied to an audio decoder 16 which performs an audio decode processing adapted to an audio coding method applied to this audio program for making audio data of a given channel into a stereo audio signal or a monaural audio signal to be supplied to an audio processor unit 17. After the audio processor unit 17 has performed an analog audio processing such as the amplification or the like, left and right speakers 18L, 18R installed within the car are caused to emit sounds.

The control information detected by the OFDM demodulation unit 14 and the TII are supplied to the receive controller unit 24 which controller unit 24 controls the frequency received in the high frequency unit 12 based on the TII and, position measuring data described below, and the like.

As concerns the road map data program of the data programs decoded by the Viterbi decoder 15, after being extracted in a navigation data detector unit 22, it is supplied to a navigation controller 34 and then stored in a memory 35 connected to the navigation controller unit 34. Also, the traffic information program of the data programs decoded by the Viterbi decoder 15 is extracted in a display data detector unit 23 and then supplied to a video signal processor unit 37.

In order to perform processings for navigation with the navigation apparatus 10, it is arranged that a GPS antenna 31 is connected to a GPS receiver unit 32 inside the navigation apparatus 10, the GPS receiver unit 32 processing to receive position measuring signals from a plurality of GPS satellites and supplying the received signals to a position estimator unit 33 which unit 33 performs a position estimate processing by analyzing signals from a plurality of satellites to determine an absolute current position. The coordinate data of the current position determined by the position estimator unit 33 are supplied to the navigation controller unit 34 for navigation processing and further to the receive controller unit 24 for use of controlling the frequency for receiving the digital audio broadcast or the like.

The navigation controller unit 34 reads the road map data in the vicinity of the current position determined by the position estimator unit 33 out of the road map data stored in the memory 35 and supplies that road map data to a depict processor unit 36 which processes to depict the road map based on that road map data. Display data of the road map depicted by the depict processor unit 36 are supplied to the video signal processor unit 37 which makes them into a video signal (picture signal) in a predetermined form and supplies the video signal to a monitor device 40 connected to the navigation apparatus 10, thus causing the monitor device 40 to display the road map or the like. For the monitor device 40, a relatively small size of picture display unit using a liquid crystal display panel, etc. can be utilized. In addition, when display data such as traffic information or the like detected by the display data detector unit 23 are supplied to the video signal processor unit 37, the traffic information, etc. is superposed on the road map to be displayed.

Figure 2:
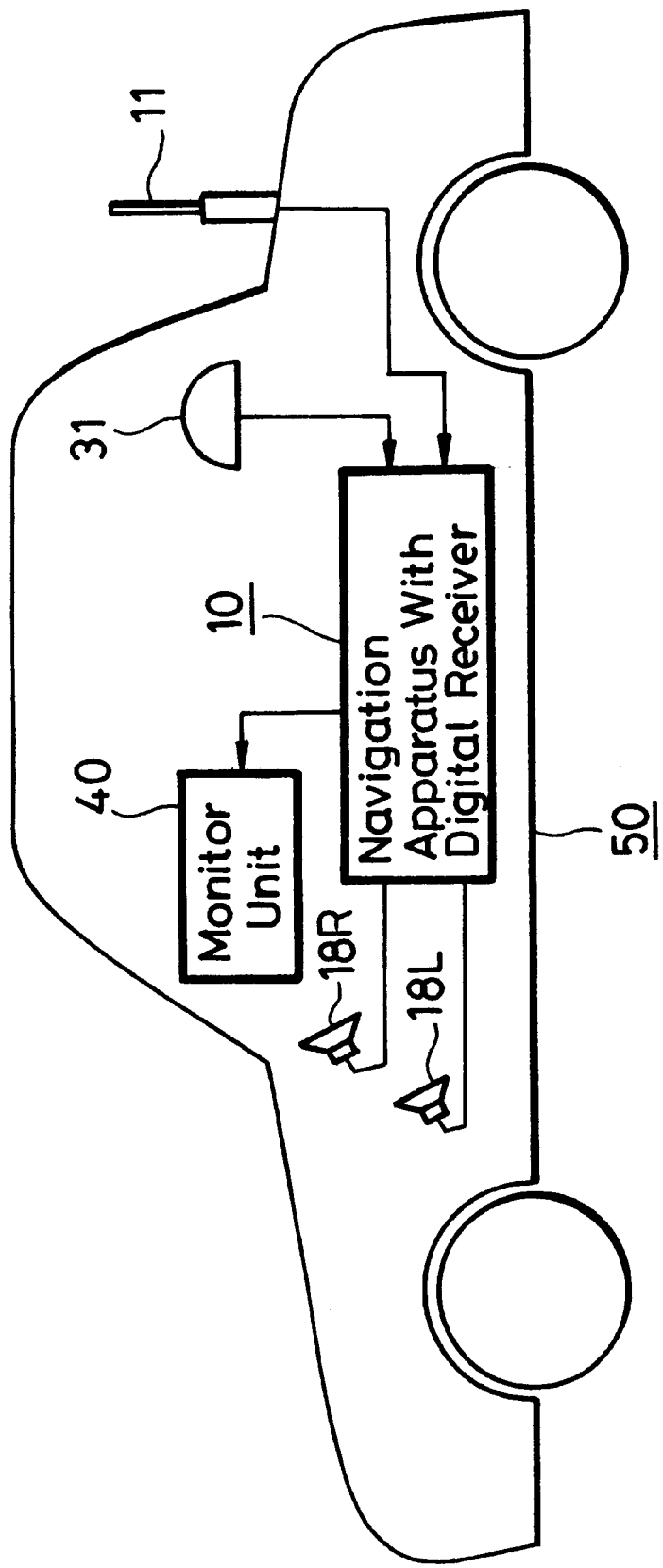
FIG. 2 is a structural diagram showing an example in which the apparatus according to an embodiment of the present invention is arranged in the car.

FIG. 2 shows an example of a state in which the navigation apparatus 10 with a digital audio broadcast receiving function according to the present embodiment is mounted on a car 50. Describing the example of the mounted state, the antenna 11 for receiving the digital audio broadcast is fixed at an appropriate position outside the car such as an upper part of the trunk in the rear of the car 50 or the like. The GPS antenna 31 is, however, fixed at an appropriate position inside or outside the car. These antennas 11, 31 are connected to the navigation apparatus 10 installed in a space inside the car (within the trunk, under a seat, etc.). Speakers 18L, 18R emitting sound (audio) according to the digital audio broadcast are placed in appropriate positions inside the car and the monitor device 40 for displaying the road map, etc. is placed at the front, namely a position where it can be seen from a driver sitting on a driver's seat of the car 50 or the like.

When the navigation is made by the above constructed navigation apparatus 10, the digital audio broadcast which can be received in the relevant area is received under the control of the receive controller unit 24 and the road map data contained in the broadcast signal is extracted by the navigation data detector unit 22 to be stored in the memory 35. At the same time, the current position is determined by the position estimator unit 33 using the GPS system and the data of road map near the current position are read out of the memory 35 for processing to display the road map based on the road map data.

By processing in this way, there is no need for the navigation apparatus 10 to prepare beforehand the road map data, e.g. the optical disc and its readout device required for the conventional navigation apparatus, thus enabling the structure of navigation apparatus to be simplified. Moreover, by renewing the road map data transmitted from the transmitting station side sequentially depending on actual road conditions, it will be possible to always make the latest road map to be displayed as compared with a case where the road map stored in the optical disc, etc. of the navigation apparatus is displayed. Therefore, it is possible for a user of the navigation apparatus to always perform the navigation based on the latest road map without processing to update it. In this case, by making also the received traffic information, etc. to be displayed simultaneously, satisfactory navigation with more detailed information will be enabled.

Furthermore, by processing to select the broadcast signal to be received at that time on the basis of the current position information determined by the position measuring function which the navigation apparatus possesses, it will be possible to always receive such a broadcast signal as provides the road map information near the current position, thus enabling satisfactory receive control by the simple controlling.

Additionally, while, in the above described embodiment, no road map data are prepared in the navigation apparatus side and only the road map data superposed on the transmitted broadcast signal are used for displaying the road map, it may be arranged that the optical disc storing the road map data, etc. and its readout device are prepared in the navigation apparatus side, and data for correcting the road map data stored in the disc are superposed on the broadcast signal to be transmitted from each transmitting station.

Also, while, in the above described embodiment, the GPS position measuring system is incorporated in the navigation apparatus side, other system (e.g. position measuring system based on the autonomous navigation) may be incorporated in the navigation apparatus. Alternatively, it may be arranged that such an absolute position measuring means is not provided, receiving conditions of the digital audio broadcast signal being considered, the transmitting station which is being received at that time being estimated from the TII, etc., the rough current position being determined from the area, etc. of that transmitting station, and the road map of the vicinity of the estimated current position being displayed.

Furthermore, while the above described embodiment relates to the system in which the road map data are transmitted by using the digital audio broadcast system termed the DAB, a system in which the road map data are added to other broadcast signals for transmission may of course be employed.

According to the method for acquiring map information set forth above, it will be possible to receive the broadcast signals in each area and at the same time acquire the map information on the relevant area to store it, thus allowing the map information on the respective areas to be acquired effectively.

According to the method for acquiring map information set forth above, because, in the invention set forth in Claim 1, the different transmitting stations in each area transmit the broadcast signals at the same frequency as well as transmit the different identification codes assigned to each area by the control information contained in the broadcast signals, it will be possible to acquire the map information on the relevant area by receiving the same frequency in any area and further decide easily from the control information which area the acquired map information is associated with.

According to the method for acquiring map information set forth above, because, the extracted map information is the information as transmitted by using a part of the transmission band of the broadcast signal transmitted from each transmitting station, it will be possible to acquire effectively the map information only by receiving the transmission band of the broadcast signal.

According to the method for acquiring map information set above, because, the received broadcast signal is digital information signal of the frame structure, which is multi-carrier modulated, the identification code for identifying the transmitting station being transmitted by using the guide information section within the frame structure, and the map information being transmitted by using a part of the band of the main channel within the frame structure, it will be possible to extract and acquire the map information from the broadcast signal by the selective processing when demodulating the so-called multicarrier signals, thus enabling the map information to be acquired by the simple processing.

According to the method for acquiring map information set forth above, because, the area covering the current position is determined from the positional information by the method of position measuring the absolute current position, and the broadcast signal transmitted from the transmitting station in the determined area is received to extract the map information, it will be possible to decide accurately the area of the broadcast signal from which the map information should be extracted by estimating the current position, where, for example, the broadcast signals from the plurality of areas can be received.

According to the method of navigation set forth above, it will be possible to receive the broadcast signal in each area and at the same time acquire the map information on the relevant area to display the map of the area covering the current position using the acquired map information, thus allowing the map of each area to be displayed effectively without storing beforehand the map information on each area on the display side.

According to the method of navigation set above, because, the different transmitting stations in each area transmit the broadcast signals at the same frequency in plural areas as well as transmit the different identification codes assigned to the respective transmitting stations by the control information contained in the broadcast signals, it will be possible to acquire the map information on the relevant area by receiving the same frequency in any area and further decide easily from the control information which area the acquired map information is associated with.

According to the method of navigation set forth above, because, the extracted map information is the information transmitted by using a part of the transmission band of the broadcast signal transmitted from each transmitting station, it will be possible to acquire effectively the map information only by receiving the transmission band of the broadcast signal for displaying the map using that information.

According to the method of navigation set forth above, because, the received broadcast signal is digital information signal of the frame structure, which is multicarrier modulated, the identification code for identifying the transmitting station being transmitted by using the guide information section within the frame structure, and the map information being transmitted by using a part of the band of the main channel within the frame structure, it will be possible to extract and acquire the map information from the broadcast signal by the selective processing when demodulating the so-called multicarrier signal, thus allowing the map information to be acquired by the simple processing for displaying the map using that information.

According to the method of navigation set forth above, because, the area covering the current position is determined from the positional information by the method of position measuring the absolute current position, the broadcast signal transmitted from the transmitting station in the determined area being received, and the map information contained in the received broadcast signal being processed to be displayed, it will be possible to decide accurately the area of the broadcast signal from which the map information should be extracted by estimating the current position, where, for example, the broadcast signals from the plurality of areas can be received.

According to the method of providing map information set forth above, the broadcast signal from each transmitting station will come to include the map information on the area covering the transmitting station and so the map information on each area can be provided effectively by using the broadcast signal.

According to the method of providing map information set forth above, because, the transmitting stations different in each area transmit the broadcast signals at the same frequency as well as transmit the different identification code assigned to each transmitting station by the control information contained in the broadcast signal, it will be possible to provide the different map information on each area using the broadcast signal having the same frequency in each area.

According to the method of providing map information set forth above, because, the map information is transmitted by using a part of the transmission band of the broadcast signal transmitted from each transmitting station, it will be possible to provide the map information effectively using the broadcast signal.

According to the method of providing map information set forth above, because, the broadcast signal transmitted from each transmitting station is digital information signal of the frame structure, which is multicarrier modulated, the identification code for identifying the transmitting station being transmitted by using the guide information section within the frame structure, and the map information being transmitted by using a part of the band of the main channel within the frame structure, it will be possible to transmit the map information using only a part of the transmission band when multiplexing into what is called the multicarrier signal, thus allowing the multiplexed map information to be transmitted effectively over the broadcast signal.

According to the navigation apparatus set forth above, the video signal for displaying the map of each area is generated based on the map information on each area contained in the broadcast signal, thereby enabling the video signal for displaying the map of each area to be generated without storing beforehand the map information on each area on the side of navigation apparatus.

According to the navigation apparatus set forth above, because, the receiver unit receives the broadcast signals from the transmitting stations in the plurality of areas at the same frequency and the transmitting station of the received signal is distinguished by the identification code in the control information contained in the broadcast signal received by the receiver unit, it will be possible to acquire the map information on the relevant area only by receiving the same frequency by the receiver unit in any area as well as decide easily from the control information on the navigation apparatus side which area the acquired map information is associated with.

According to the navigation apparatus set forth above, because, the map information extracted by the map information extractor unit is the information transmitted by using a part of the transmission band of the broadcast signal transmitted from each transmitting station, it will be possible to acquire the map information effectively only by receiving the transmission band of the broadcast signal, thus allowing the video signal for displaying the map based on that information to be generated.

According to the navigation apparatus set forth above, because, the broadcast signal received by the receiver unit is digital information signal of the frame structure, which is multicarrier modulated, the identification code for identifying the transmitting station being transmitted by using the guide information section within the frame structure, and the map information extractor unit extracting a part of the band of the main channel within the received signal of the frame structure, it will be possible to extract and acquire the map information from the broadcast signal by the selective processing when demodulating what is the called multicarrier signal, thus making it possible to acquire the map information by the simple processing for generating the video signal to display the map using that information.

According to the navigation apparatus set forth above, because, in the invention set forth in Claim 15, the positioning unit for determining the absolute current position as well as the controller unit which determines the area covering the current position from the current position determined by the position measuring unit and makes the broadcast signal transmitted from the transmitting station in the area estimated by the receiver unit to be received are provided, it will be possible to decide accurately from the current position determined by the controller unit the area of the broadcast signal from which the map information should be extracted, where, for example, the broadcast signals from the plurality of areas can be received.

According to the map information providing apparatus set forth above, the broadcast signal transmitted from the transmitter unit will come to include the map information on the area where the transmitter unit is installed and so the map information on each area can be provided effectively using the broadcast signal.

According to the map information providing apparatus set forth above, because, the broadcast signal transmitted from the transmitter unit is transmitted by using the same frequency at least in the predetermined plural stations and the identification code assigned to one's own station is transmitted by the control information contained in the broadcast signal transmitted from the transmitter unit, it will be possible to provide the different map information in each area using the broadcast signal at the same frequency in each area.

According to the map information providing apparatus set forth above, because, the map information is transmitted by using a part of the transmission band of the broadcast signal transmitted from the transmitter unit, the map information can be provided effectively by using the broadcast signal.

According to the map information providing apparatus set forth above, because, the broadcast signal transmitted from the transmitter unit is digital information signal of the frame structure, which is multicarrier modulated, the identification code for identifying the transmitting station being transmitted by using the guide information section within the frame structure, and the map information being transmitted by using a part of the band of the main channel within the frame structure, it will be possible to transmit the map information using only a part of the transmission band when multiplexing into what is called the multicarrier signal, thus enabling the multiplexed map information on the broadcast signal to be processed effectively for transmission.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A method for acquiring map information comprising the steps of:

receiving a broadcast signal including at least map information and traffic information transmitted from transmitting stations such that said map information and traffic information correspond only to the area in which the transmitting station that transmitted the broadcast signal is located, and wherein different transmitting stations are located in different respective areas, extracting said map information corresponding specifically to each respective area, said map information being contained in the received broadcast signal, and storing the extracted map information.

2. The method for acquiring map information according to claim 1, wherein said transmitting stations which are different in respective areas transmit the respective broadcast signals at a same frequency and transmit different respective identification codes determined in each said transmitting station as control information contained in the predetermined broadcast signals.

3. The method for acquiring map information according to claim 1, wherein said extracted map information is information which is transmitted by using a part of a transmission bandwidth of the respective predetermined broadcast signals transmitted from the respective transmitting stations.

4. The method for acquiring map information according to claim 3, wherein said received predetermined broadcast signals are digital information signals that are multicarrier modulated in a frame structure, said identification codes for identifying the transmitting stations are transmitted by using a guide information section within the frame structure, and said map information is transmitted by using a part of a bandwidth of a main channel within the frame structure.

5. The method for acquiring map information according to claim 1, wherein an area that covers a current position is estimated from positional information based on an absolute position measuring method, and the predetermined broadcast signal transmitted from the transmitting station in the estimated area is received for extracting the map information.

6. A method of navigation comprising the steps of receiving a broadcast signal including at least map information and traffic information transmitted from transmitting stations such that said map information and traffic information correspond only to the area in which the transmitting station that transmitted the broadcast signal is located, and wherein different transmitting stations are located in different respective areas, extracting said map information specifically of each area, said map information being contained in the received broadcast signal, and making a map of an area covering a current position using said map information extracted from said broadcast signals and displaying the map.

7. The method of navigation according to claim 6, wherein said transmitting stations which are different in respective areas transmit the predetermined broadcast signals at a same frequency in a plurality of areas and transmit different respective identification codes determined in the respective transmitting stations by using control information contained in the predetermined broadcast signals.

8. The method of navigation according to claim 6, wherein said extracted map information is information that is transmitted by using a part of transmission bandwidth of the respective predetermined broadcast signal transmitted from each of the transmitting stations.

9. The method of navigation according to claim 8, wherein said received predetermined broadcast signal is a digital information signal that is multicarrier modulated in a frame structure, said identification code for identifying the transmitting station is transmitted by using a guide information section within the frame structure, and said map information is transmitted by using a part of a bandwidth of a main channel within the frame structure.

10. The method of navigation according to claim 6, wherein an area covering a current position is estimated from positional information based on an absolute position measuring method, and the predetermined broadcast signal transmitted from the transmitting station in the estimated area is received for processing to display the map information contained in the received predetermined broadcast signal.

11. A method of providing map information comprising the steps of:

arranging different transmitting stations in different respective areas, each of said transmitting stations transmitting a different broadcast signal, and at the same time, superimposing map information corresponding to the respective area in which each transmitting station is located on the broadcast signal from each transmitting station in each respective area and then transmitting the broadcast signal.

12. The method of providing map information according to claim 11, wherein said different transmitting stations in the respective areas transmit the respective broadcast signals at a same frequency and transmit different respective identification codes determined in the respective transmitting stations by using control information contained in the broadcast signals.

13. The method of providing map information according to claim 11, wherein said map information is transmitted by using a part of a transmission bandwidth of the broadcast signal transmitted from each of the transmitting stations.

14. The method of providing map information according to claim 13, wherein said broadcast signal transmitted from each of the transmitting stations is a digital information signal which is multicarrier modulated in a frame structure, said identification code for identifying the transmitting station is transmitted by using a guide information section within said frame structure, and said map information is transmitted by using a part of a bandwidth of a main channel within the frame structure.

15. A navigation apparatus comprising:

a receiver unit for receiving a broadcast signal including at least map information and traffic information transmitted from a transmitting station such that said map information and traffic information correspond only to the area in which the transmitting station that transmitted the broadcast signal is located, and wherein different transmitting stations are located in a specific area of a plurality of areas, a map information extractor unit for extracting said map information corresponding to the specific area, said map information being contained in the broadcast signal received by said receiver unit, and a video signal generator unit for generating a video signal to display a map within an area covering a current position on the basis of said extracted map information.

16. The navigation apparatus according to claim 15, wherein said receiver unit receives at a same frequency the broadcast signals from the respective transmitting stations in the plurality of areas, and the transmitting station of the received signal is distinguished by an identification code in control information contained in the broadcast signal received by said receiver unit.

17. The navigation apparatus according to claim 15, wherein said map information extracted by said map information extractor is information transmitted by using a part of a transmission bandwidth of the broadcast signal transmitted from each transmitting station.

18. The navigation apparatus according to claim 17, wherein said broadcast signal received by said receiver unit is digital information signal of a frame structure, which is multicarrier modulated, said identification code for identifying the transmitting station is transmitted by using a guide information section within the frame structure, and said map information extractor unit extracts a part of a bandwidth of a main channel within the received signal of the frame structure.

19. The navigation apparatus according to claim 15, further comprising a position measuring unit for measuring an absolute current position, and a controller unit for estimating an area covering a current position using the absolute current position determined by said position measuring unit and causing the broadcast signal transmitted from the transmitting station in the area estimated by said controller unit to be received.

20. A map information providing apparatus comprising a storage unit for storing map information specifically corresponding to an area where a user's station is arranged, and a transmitter unit for superimposing the map information stored in said storage unit on a signal supplied from a broadcast center side and for transmitting a superimposed signal as a broadcast signal to be received by the user's station in the area.

21. The map information providing apparatus according to claim 20, wherein said broadcast signal transmitted by said transmitter unit is transmitted using a same frequency in predetermined plural stations, and an identification code assigned to the user's station is transmitted using control information contained in said broadcast signal transmitted by said transmitter unit.

22. The map information providing apparatus according to claim 20, wherein said map information is transmitted using a part of a transmission bandwidth of said broadcast signal transmitted by said transmitter unit.

23. The map information providing apparatus according to claim 21, wherein said broadcast signal transmitted by said transmitter unit is formed as a digital information signal having a frame structure, which is multicarrier modulated, said identification code for identifying the transmitting station is transmitted by using a guide information section within the frame structure, and said map information is transmitted by using a part of a bandwidth of a main channel within the frame structure.

* * * * *